US012594572B2

(12) United States Patent
Cortavitarte Pérez

(10) Patent No.: US 12,594,572 B2
(45) Date of Patent: Apr. 7, 2026

(54) ARTICULATED AND EXTENDIBLE ROTARY HEAD FOR A PRESSURISED AIR JET SPRAY GUN

(71) Applicant: Daniel Cortavitarte Pérez, Avilés (ES)

(72) Inventor: Daniel Cortavitarte Pérez, Avilés (ES)

( * ) Notice: Subject to any disclaimer, the term of this patent is extended or adjusted under 35 U.S.C. 154(b) by 1193 days.

(21) Appl. No.: 16/966,904

(22) PCT Filed: Feb. 1, 2019

(86) PCT No.: PCT/ES2019/000008
§ 371 (c)(1),
(2) Date: Jan. 8, 2021

(87) PCT Pub. No.: WO2019/149974
PCT Pub. Date: Aug. 8, 2019

(65) Prior Publication Data

US 2024/0238825 A1 Jul. 18, 2024

(30) Foreign Application Priority Data

Feb. 2, 2018 (ES) .............................. ES201800031

(51) Int. Cl.
*B05B 15/652* (2018.01)
*B05B 12/00* (2018.01)

(52) U.S. Cl.
CPC .......... *B05B 15/652* (2018.02); *B05B 12/002* (2013.01)

(58) Field of Classification Search
CPC ........ B05B 15/65; B05B 15/652; B05B 15/68
USPC ........ 239/565, 587.5, 588; 285/145.2, 145.5, 285/147.1, 147.3, 226, 274
See application file for complete search history.

(56) References Cited

U.S. PATENT DOCUMENTS

| | | | | |
|---|---|---|---|---|
| 3,663,044 | A * | 5/1972 | Contreras | F16L 27/0857 403/57 |
| 3,759,447 | A * | 9/1973 | Weigmann | F02K 1/82 239/588 |
| 4,129,092 | A | 12/1978 | Wiggins | |
| 4,494,417 | A | 1/1985 | Larson et al. | |

(Continued)

FOREIGN PATENT DOCUMENTS

| | | | |
|---|---|---|---|
| CN | 205109963 | U | 3/2016 |
| CN | 106824590 | A | 6/2017 |

(Continued)

*Primary Examiner* — Jason J Boeckmann
(74) *Attorney, Agent, or Firm* — The Webb Law Firm

(57) ABSTRACT

The invention relates to an articulated and extendible rotary head for a pressurised air jet spray gun, formed by rotary modules that are articulated, combined and stacked such that they can be bent for use on corners or edges. The first module is a supporting clamp module in the form of a quadrilateral with curved sides attached using swivel screws to the body of the gun or to another rear or front clamp module, through which extend a bellows that channels the liquid to be sprayed, two air supply hoses and the needle obstructing the paint opening, all terminating in a front-end second module in the form of a hollow truncated cylinder with a central outlet for spray liquid, blocked by a shut-off needle tip that can be extracted by pulling a trigger in order to release the spray jet, with the needle divided into two parts connected by a flexible, high-tenacity traction wire and a recovery spring.

4 Claims, 8 Drawing Sheets

(56) References Cited

U.S. PATENT DOCUMENTS

| | | | | |
|---|---|---|---|---|
| 5,295,626 | A * | 3/1994 | Mirabito ............... | B05B 9/0423 239/526 |
| 5,887,800 | A * | 3/1999 | McClosky ............... | B25J 17/02 239/587.5 |
| 2004/0245770 | A1* | 12/2004 | Christianson ............. | F02K 1/80 285/145.5 |
| 2014/0034756 | A1 | 2/2014 | Gantenbein et al. | |

FOREIGN PATENT DOCUMENTS

| | | | |
|---|---|---|---|
| EP | 1579919 | A1 | 9/2005 |
| EP | 2255885 | A1 | 12/2010 |
| WO | 9500252 | A1 | 1/1995 |

* cited by examiner

ARTICULATED AND EXTENDIBLE ROTARY HEAD FOR A PRESSURISED AIR JET SPRAY GUN

TECHNICAL FIELD

The proposed invention is appropriated for the industrial accessories for painting and preparing surfaces of every type of industrial devices, vehicles, furniture or buildings industry.

BACKGROUND TO THE PREVIOUS TECHNICAL SITUATION

In the current state of the art in the industry of spray-painting, treatment or reparation of surfaces as automobiles bodyworks, boats, vehicles, industrial devices, furniture or buildings, the pressurised air jet spray gun is commonly used and it is formed by a handle or a tank for paint or another impregnation liquid connected to a pressurised air source to be applied to a body surface, a traction trigger that retracts from the head a shut-off needle tip of the impregnation liquid to allow jet beam outlet in which there are openings for pressurised air independent outlet supplied by hoses from a compressor or another pressurised air source.

In the current state of art the gun design causes a straight beam and it is difficult to apply to the surfaces of the lateral or rear faces of three-dimensional bodies with corners or edges, which can be of variable dimensions and be situated in limited space areas. The proposed invention is an extendible head of the jet spray liquid gun nozzle formed by a certain number of predefined articulated, combined and stacked clamp modules assembled by the user in each case at the end of which a front-end projection head module is installed that is articulated with the clamp supporting modules in an unlimited number, through which extend a bellows that channels the liquid to be sprayed, two pressurised air supply hoses able to prevent ruptures, all of them with variable length for each case selected by the user that allow the extendible arm to project liquid spray can be bent to be applied with the appropriate angle to the lateral or rear faces of three-dimensional bodies of variable sizes. (FIG. 1 and FIG. 2)

DISCLOSURE OF THE INVENTION

The invention is an extendible and articulated rotary head of a in a public domain gun nozzle for a pressurised air jet spray formed by a base clamp module (5) to join the gun body in the form of a quadrilateral with curved arch-shaped sides whose centre has a projection with a hole with thread where an screw device (7) joined to the body of the gun by an axis can be placed and a screw-nut device (6) in the perpendicular transverse axial axis to assemble with the next combined and stacked clamp or with the front-end module of the projection nozzle (1), an unlimited number of these intermediate articulated clamp modules can be articulated to reach the front-end projection module (FIG. 2).

The second type of combined articulated module located at the end of the set is the front-end or front nozzle (1) that roots in the preceding external end of the set by means of two rotating screws in the preceding clamp module that holds it (6) with which it is articulated. The front-end module with nozzle is in the form of a hollow truncated cylinder (FIG. 4) joined by means of a flexible bellows (9) that channels the paint cartridge or another liquid to be sprayed (2) with outlets in the rear external face of the front-end for pressurised air connected to the air supply hoses able to prevent ruptures (8) and a central outlet for the paint or any other liquid to be sprayed placed into the needle tip (11) blocked or clogged by a shut-off needle tip (11) that can be extracted from the outlet by pulling a trigger (3) from its back end in order to release the spray jet of pulverized paint or liquid impelled by the pressurised air (10) with the new essential characteristic consisting in that needle is divided or decomposed into two parts, one of them is the tip (11) and the other is the rod (13) joined by a flexible, high-tenacity traction wire made of steel, industrial nylon or equivalent material (12), to allow the head bending in such a way the needle does not break. The front part of the needle is the needle tip located in a guide with a recovery spring (14) to relocate it in a obstructing position when the trigger traction ends and the rear part of the needle is an axis or cylindrical rod located in the body of the gun that retracts (13) and causes backward traction by means of a trigger and because of it is joined to the needle tip by means of the flexible high-tenacity traction wire it allows the needle axis bending when the front-end module with nozzle where its tip is located rotates (FIG. 5), this tip joins from the guide it is located to the rigid axis of the needle located in the cylindrical body of the gun axis by means of the flexible, high-tenacity traction wire, which allows the head can be bent (FIG. 5) to adapt the liquid projection to the rear part of corners and edges of the body that has to be painted or pulverised and to increase the distance between the user and the jet spray for health and safety reasons.

Through the clamp modules extend a bellows that channels the liquid (9) connected with the cartridge or tank (2) for the liquid that has to be sprayed that ends in the cylindrical trunk of the front-end module of the nozzle (FIG. 4) to lead the impregnating liquid and two pressurised air supply hoses able to prevent ruptures (8) that end in the air outlets in the external face of the front-end.

INSTRUCTIONS AS TO THE BEST WAY OF BRINGING THE INVENTION INTO EFFECT

Figure 2:
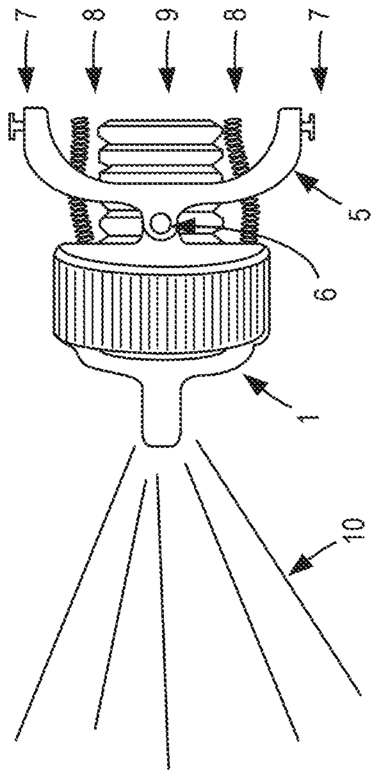
In FIG. 2 the new invented nozzle head is presented in side profile (1) with the supporting clamp (5), the screws in the perpendicular axial axis for connection with the preceding module or with the front module (7 and 6), the bellows that channels the liquid (9), the pressurised air supply hoses able to prevent ruptures (8) and the spray jet (10).
Figure 1:
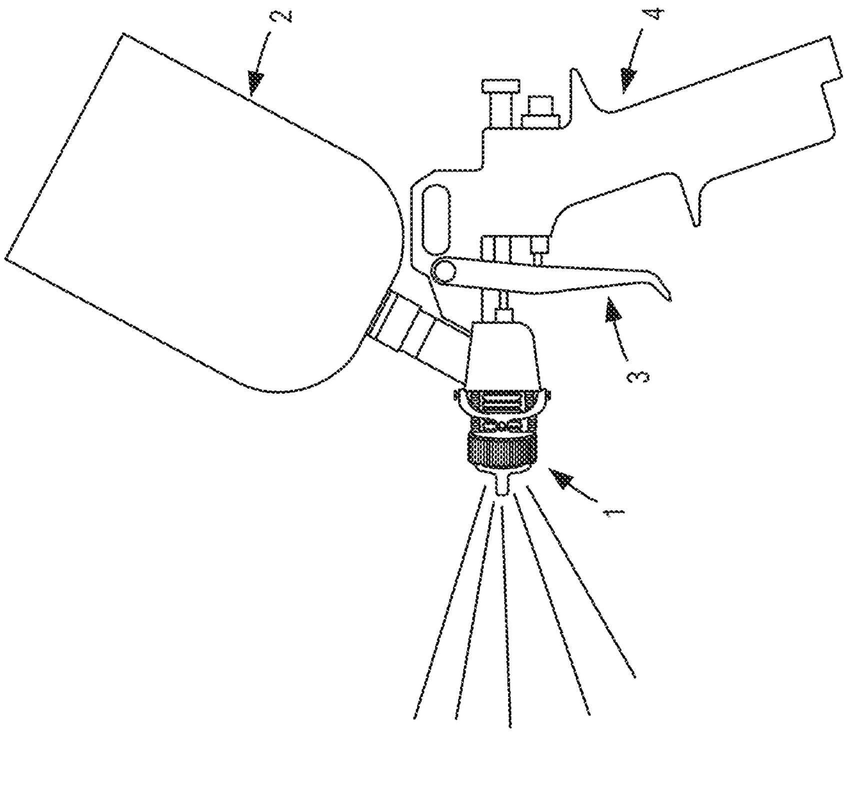
In FIG. 1 a jet spray in a public domain gun is presented in side profile with its projection nozzle (1), the cartridge or tank for the liquid that has to be pulverised (2), the handle (4) and the traction trigger of the obstructive needle (3).
Figure 4:
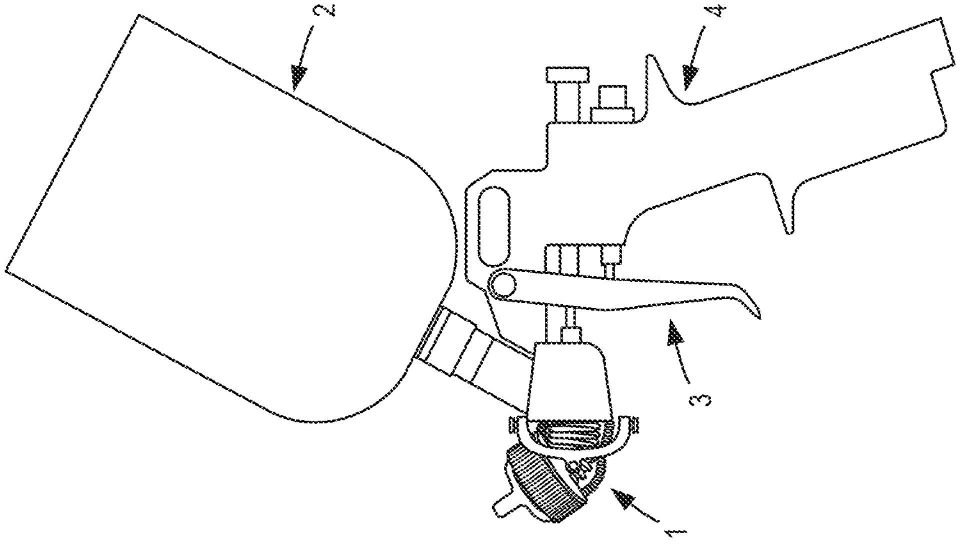
In FIGS. 3 and 4 the projection nozzle head (1) is presented in two swivel positions in plan view from the upper part of the tank (2) with the supporting clamp (5) articulated on two connecting screws, one of them (6) with the nozzle (1) and another two on the body of the gun (7), with two pressurised air supply hoses able to prevent ruptures (8) and the bellows that channels the liquid that has to be sprayed inside (9).
Figure 3:
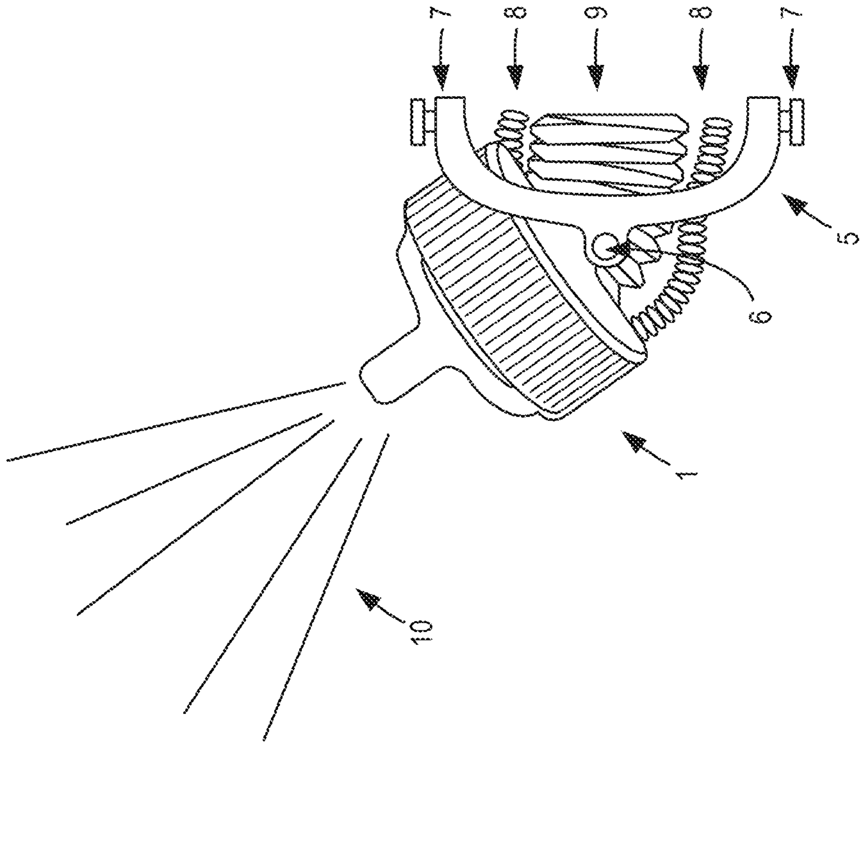
Figure 6:
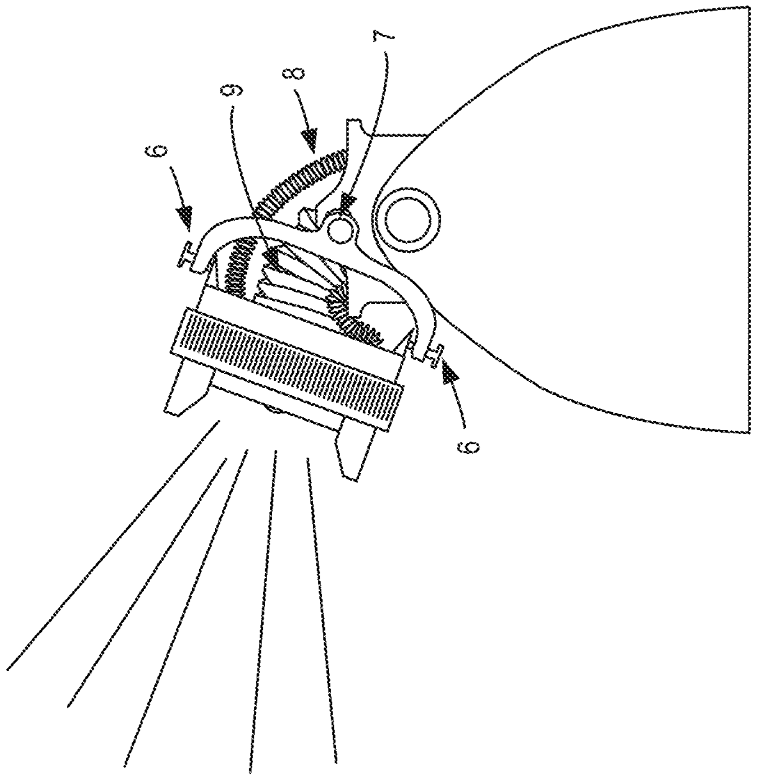
FIGS. 5 and 6 depict further additional views of the articulating projection nozzle head (1) where the front-end module is in the form of a hollow truncated cylinder joined by means of a flexible bellows (9).
Figure 5:
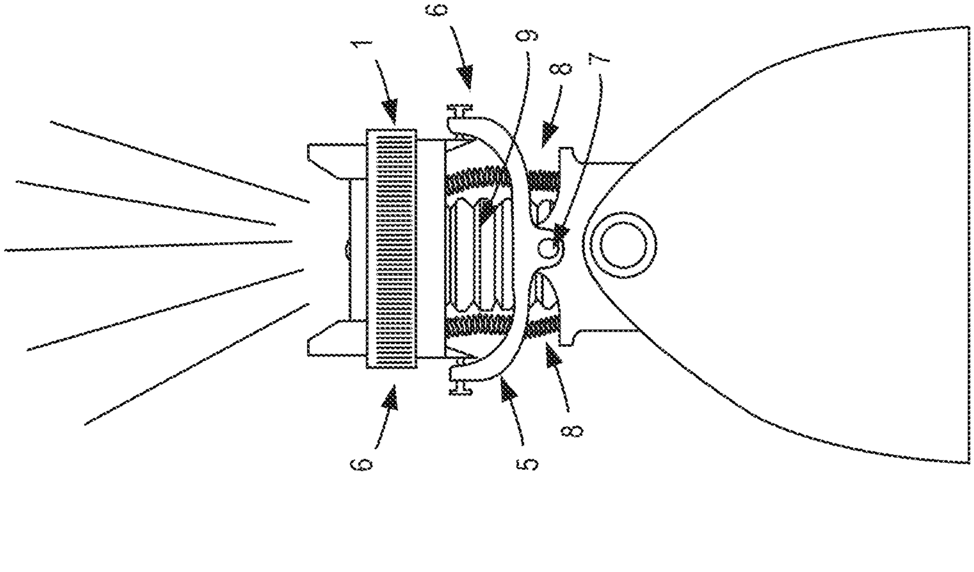
Figure 8:
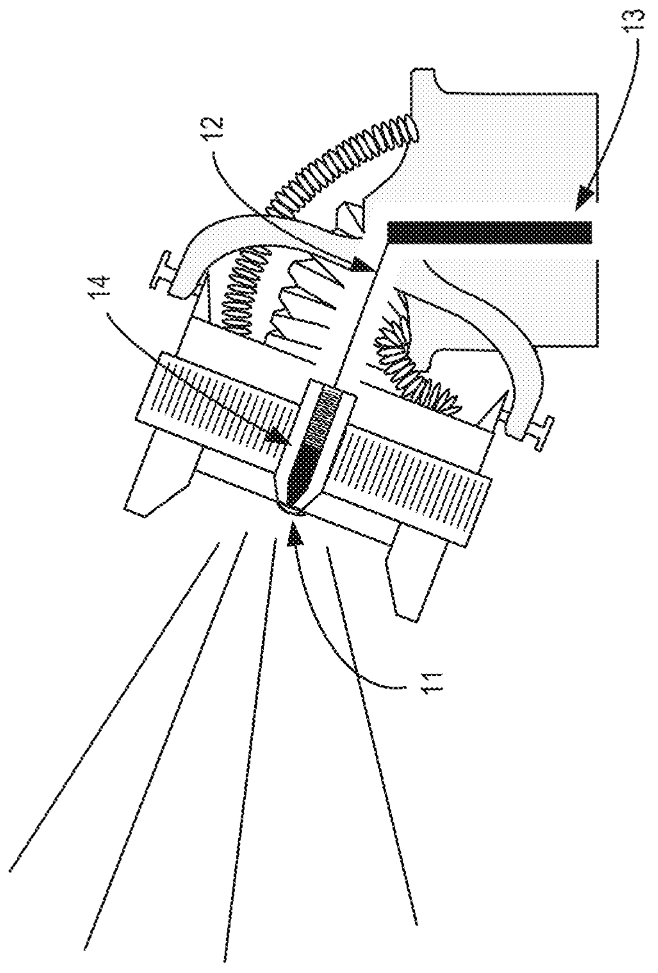
In FIGS. 7 and 8 the needle located in the head decomposed in two parts is presented in plan view in two positions, the needle tip (11) with a recovery spring (14) located in a head guide cylinder with an outlet in the centre of the external face, the high-tenacity traction joining wire (12) and the retractable needle axis or rod (13) that activates by pulling the trigger.
Figure 7:
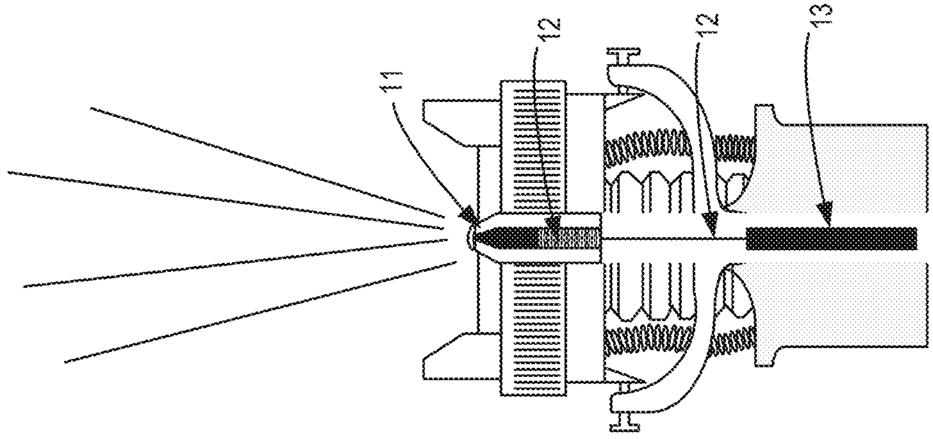
Figure 9:
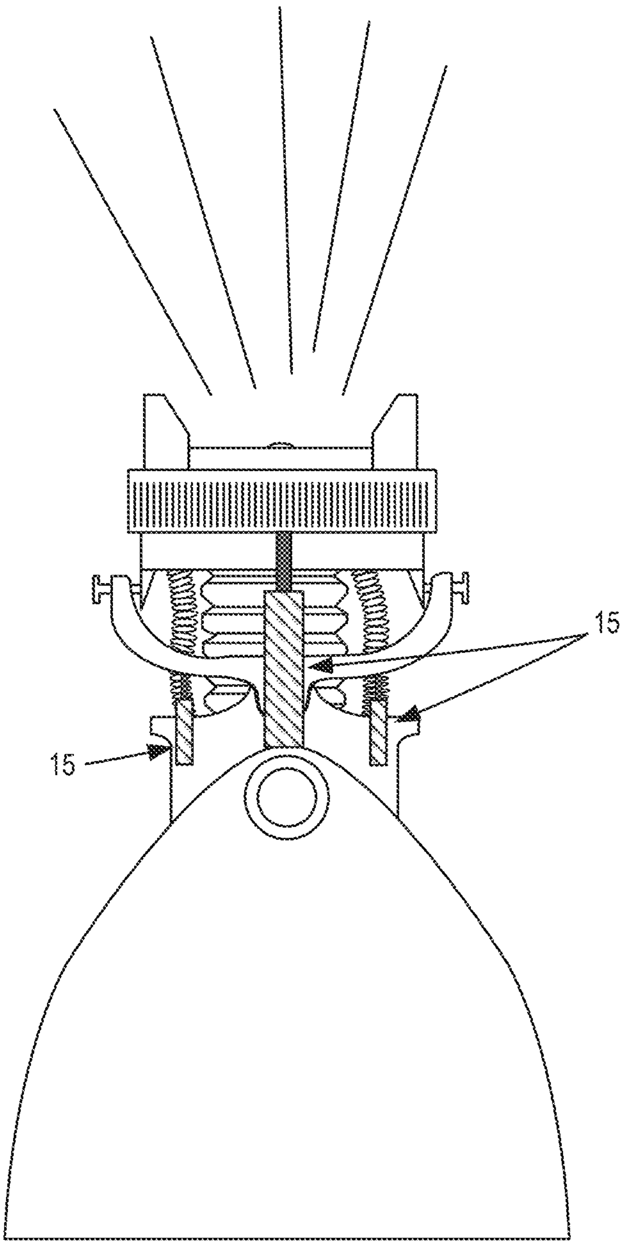
In FIG. 9 the head with the pneumatic or electric pistons that are operated with one hand to cause the head rotation is presented in plan view.
Figure 10:
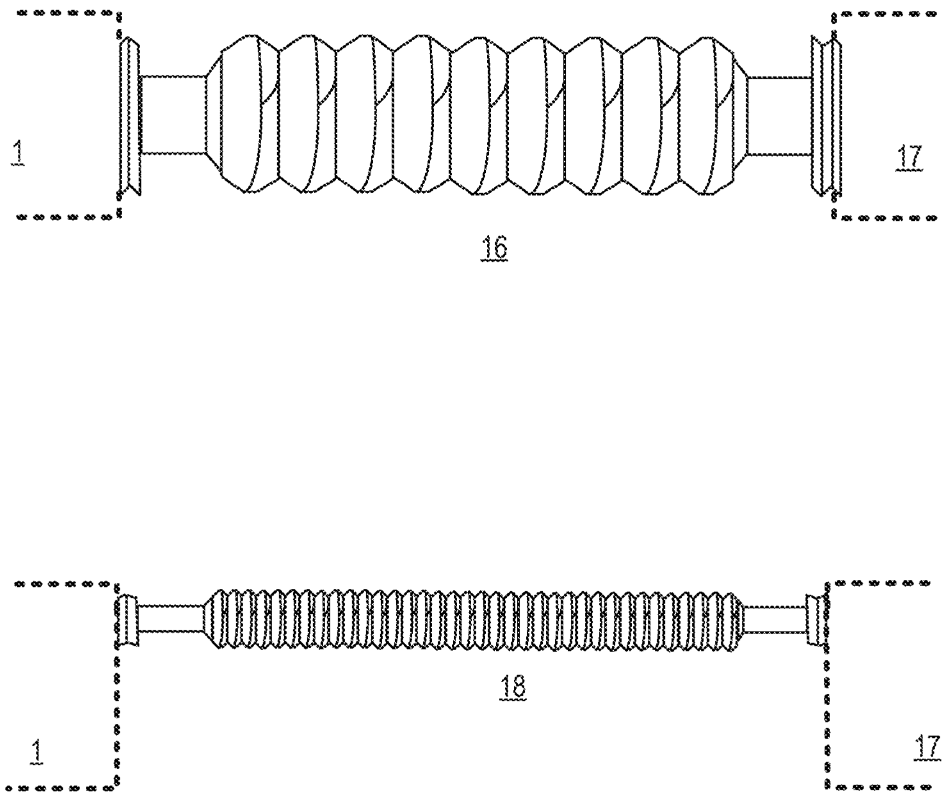
In FIG. 10 in detail the bellows that channels the liquid (16), as submitted assembled in (9) and the pressurised air hose able to prevent ruptures (18) as submitted assembled in (8) that join the base (17) to the nozzle (1) are presented.
Figure 11:
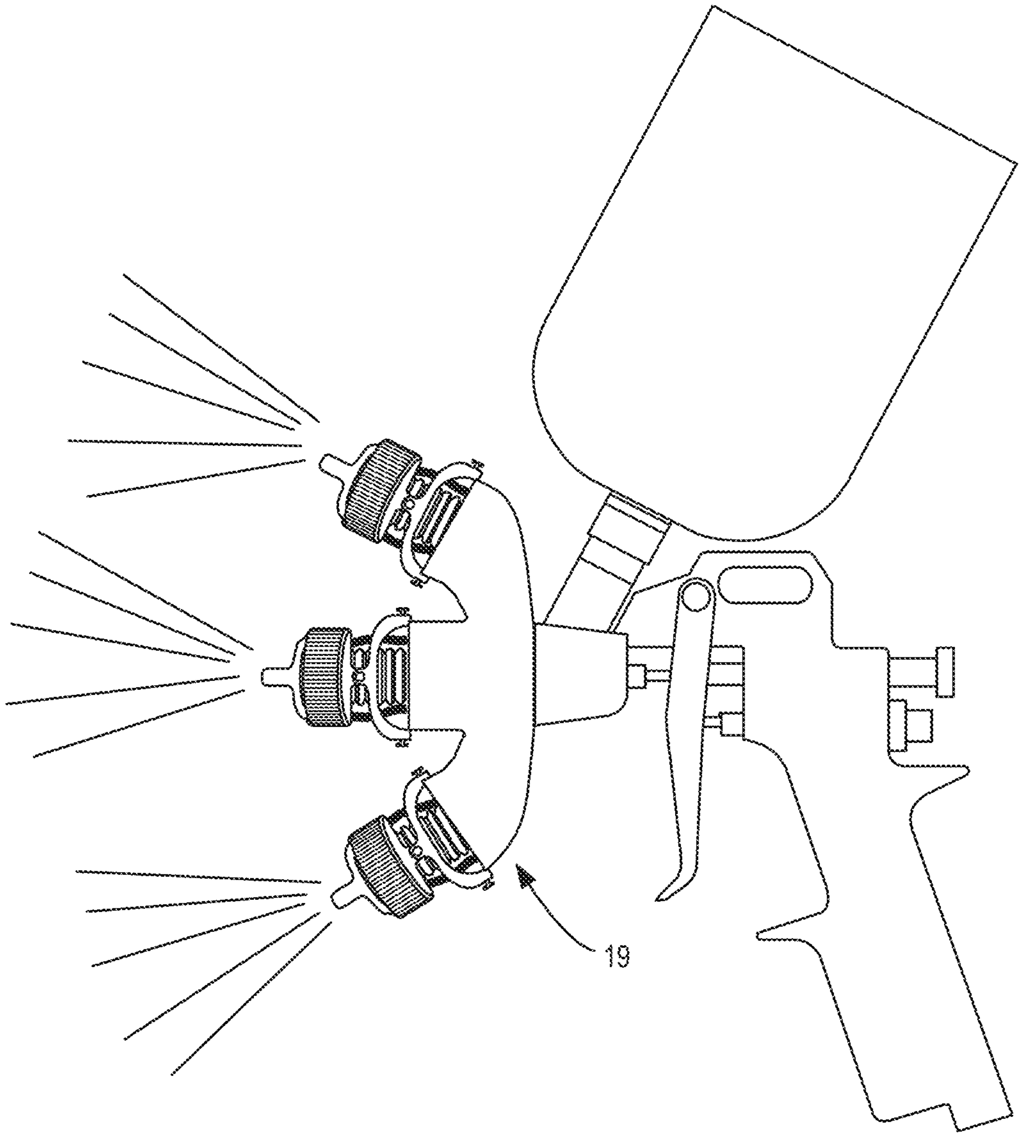
In FIG. 11 a triple head mounted on a tubular structure with three openings is presented (19).
Figure 12:
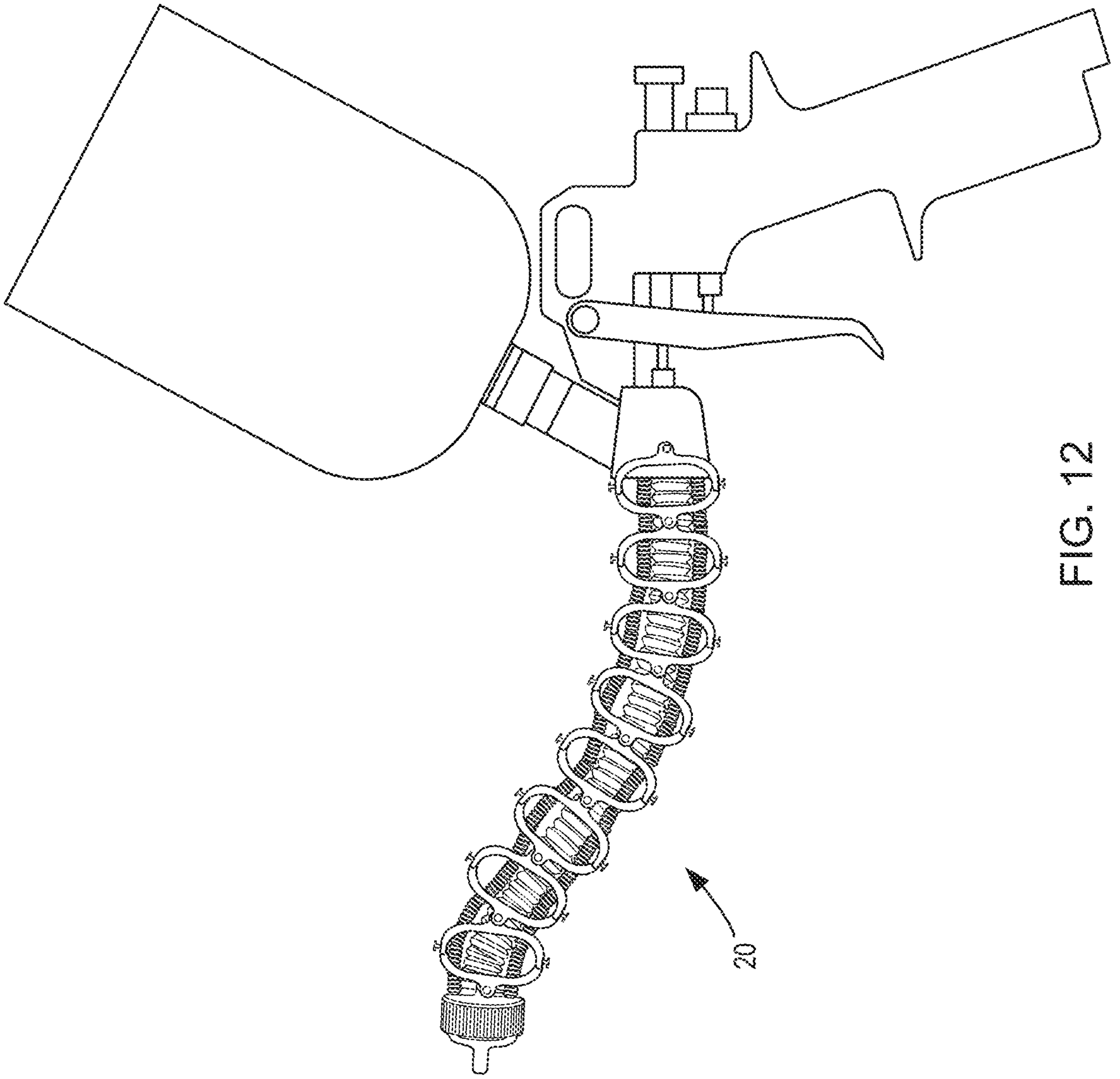
In FIG. 12 a projection head articulated spread neck with multiple articulated clamps and the front end of the head nozzle (20) are presented.

The best way of bringing the invention into effect consists in a set of clamp modules (5), the first of which is installed at the base of union with the body of the gun in the form of a quadrilateral with curved arch-shaped sides whose centre has a projection with a hole with thread where an screw device (7) joined to the body of the gun by an axis can be placed and a screw-nut device (6) in the perpendicular transverse axial axis to assemble with the next combined and stacked clamp or with the front-end module of the projection nozzle (1), every combined and stacked module are articulated with each other, joined at the end of the line to the front-end module of the projection nozzle, so that next modules are sustained and the articulated rotation of every module in left or right direction or up and down is allowed and through which extend a bellows that channels the liquid to be sprayed (9), the hollow air supply hoses able to prevent ruptures (8) and the paint outlet blocking needle (11). The second type of articulated module is the nozzle front-end (FIG. 2) that roots in the preceding external end of the set by means of two rotating screws (7) to the preceding clamp module that holds it (5) with which it is articulated. The front-end module is in the form of a hollow truncated cylinder joined by means of a flexible bellows (9) that channels the paint cartridge or another liquid to be sprayed (2) with outlets in the preceding external face of the front-end for pressurised air connected to the air supply hoses able to prevent ruptures and a central outlet for the paint or any other liquid to be sprayed (FIG. 6) blocked or clogged by a shut-off needle tip (11) that can be extracted from the outlet by pulling a trigger (3) from its back end in order to release the spray jet of pulverized paint or liquid impelled by the pressurised air with the new essential characteristic consisting in that needle is divided or decomposed into two parts (FIG. 6, 11, tip, and 13, rod) joined by a flexible, high-tenacity traction wire made of steel, industrial nylon or equivalent material (12). The front part of the needle is the needle tip located in a guide with a recovery spring (14) to relocate it in a obstructing position when the trigger traction ends and the rear part of the needle is an axis or cylindrical rod (13) located in the body of the gun that retracts and causes backward traction by means of a trigger and because of it is joined to the needle tip by means of the flexible high-tenacity traction wire it allows the needle axis bending when the front-end module where its tip is located rotates (FIG. 7), this tip joins from the guide it is located to the rigid axis of the needle located in the cylindrical body of the gun axis by means of the flexible, high-tenacity traction wire, which allows the head can be bent (FIG. 5) to adapt the liquid projection to the rear part of corners and edges of the body that has to be painted or pulverised.

WAYS OF COMMERCIAL USE

The proposed invention is susceptible to be commercially used in the sector of spray-painting, enameling and treatment of surfaces.

The invention claimed is:

1. An articulated and extendible rotary head for use with a pressurized air jet spray gun comprising a coupling between two types of articulated rotary modules for bent use on corners or edges of a body to be pulverised, wherein a first module is a supporting hollow clamp module comprising an end and formed as a quadrilateral with curved arched sides, wherein a center of the supporting hollow clamp module has a projection with two anchor rotating screws for anchoring the supporting hollow clamp module on a body of a pressurized air jet spray gun or on another preceding clamp module and two other anchor rotating screws on a perpendicular axial axis for joining the supporting hollow clamp module to a next intermediate module to support following modules and to allow the articulated rotation of every module in a left or right direction or up and down, wherein through the supporting hollow clamp module extends a channelling bellows that channels a liquid to be sprayed, wherein inside the channelling bellows extends a flexible high-tenacity traction wire made of steel or industrial nylon, hollow air supply hoses, and an outlet blocking needle which comprises a tip located at the front part of the outlet blocking needle, and a cylindrical rod located at the rear part of the outlet blocking needle, the tip and the cylindrical rod being joined by the flexible high-tenacity traction wire, wherein a second module is a nozzle front-end module anchored in the end of the supporting hollow clamp module by means of the two other anchor rotating screws to the supporting hollow clamp module, wherein the anchoring is articulated, and wherein the nozzle front-end module is supported on the supporting hollow clamp module, wherein the nozzle front-end module is a hollow truncated cylinder joined by means of the flexible channelling bellows to a cartridge of the liquid to be sprayed, wherein the cartridge houses the flexible high-tenacity traction wire, wherein the nozzle front-end module comprises outlets for the outlet of pressurized air, the outlets being located in a rear external face of the nozzle front-end module and connected to the hollow air supply hoses able to prevent ruptures, wherein the nozzle front-end module comprises a central outlet for the outlet of the liquid to be sprayed, wherein the central outlet is blocked by the tip of the outlet blocking needle, and wherein the tip of the outlet blocking needle can be extracted from the central outlet by pulling a trigger from a back end releasing a spray jet of liquid to be sprayed impelled by pressurized air, wherein the tip of the outlet blocking needle is located in a guide with a recovery spring to relocate the tip in a obstructing position when the pulling of the trigger ends, and wherein the cylindrical rod of the outlet blocking needle is located in the body of the pressurized air jet spray gun, retracts and causes backward traction by means of the trigger, bends an axis of the outlet blocking needle when the nozzle front-end module rotates, thus bending the articulated and extendible rotary head to adapt the liquid to be sprayed to the rear part of corners and edges of the body to be pulverised.

2. The articulated and extendible rotary head for use with a pressurized air jet spray gun according to claim 1, further comprising two or more nozzle front- end modules that are articulated with a supporting hollow clamp module in turn articulated with the end of a tubular piece that has several coupling arms to the body of the pressurized air jet spray gun.

3. The articulated and extendible rotary head for use with a pressurized air jet spray gun according to claim 1, wherein the rotary head is fitted with a set of pistons of pneumatic or hydraulic bottle in the supporting hollow clamp module that is the base of coupling with the body of the pressurized air jet spray gun to control the articulated modules rotation and the spray jet direction with the same hand that holds the pressurized air jet spray gun.

4. A pressurized air jet spray gun comprising:

an articulated and extendible rotary head according to claim 1 mounted on and connected to the pressurized air jet spray gun.

* * * * *